(12) United States Patent
Kim et al.

(10) Patent No.: US 7,198,194 B2
(45) Date of Patent: Apr. 3, 2007

(54) TWO-DIMENSIONAL CODE HAVING SUPERIOR DECODING PROPERTIES MAKING IT POSSIBLE TO CONTROL THE LEVEL OF ERROR CORRECTING CODES, AND A METHOD FOR ENCODING AND DECODING THE SAME

(75) Inventors: Kyoung-Tae Kim, Haengdang-dong (KR); Dong-Jin Kwon, Seongnam-si (KR)

(73) Assignee: Iconlab Inc., Seoul (KR)

( * ) Notice: Subject to any disclaimer, the term of this patent is extended or adjusted under 35 U.S.C. 154(b) by 0 days.

(21) Appl. No.: 10/532,814

(22) PCT Filed: Oct. 28, 2003

(86) PCT No.: PCT/KR03/02284

§ 371 (c)(1),
(2), (4) Date: Apr. 26, 2005

(87) PCT Pub. No.: WO2004/040506

PCT Pub. Date: May 13, 2004

(65) Prior Publication Data

US 2006/0163357 A1 Jul. 27, 2006

(30) Foreign Application Priority Data

Oct. 31, 2002 (KR) .................. 10-2002-0066980

(51) Int. Cl.
*G06K 9/18* (2006.01)

(52) U.S. Cl. ............... 235/462.09; 235/462.1; 235/462.07; 235/462.01

(58) Field of Classification Search ........... 235/462.01, 235/462.08, 462.09, 494, 462.1
See application file for complete search history.

(56) References Cited

U.S. PATENT DOCUMENTS

| | | | |
|---|---|---|---|
| 5,304,786 A | 4/1994 | Pavlidis et al. | |
| 5,726,435 A | 3/1998 | Hara et al. | |
| 5,742,041 A * | 4/1998 | Liu | 235/462.08 |
| 5,771,245 A | 6/1998 | Zhang | |
| 5,811,787 A | 9/1998 | Schuessler et al. | |
| 6,047,892 A | 4/2000 | Schuessler et al. | |
| 6,081,627 A * | 6/2000 | Kannon et al. | 382/312 |
| 6,102,289 A * | 8/2000 | Gabrielson | 235/462.01 |

FOREIGN PATENT DOCUMENTS

JP 2000-200321 7/2000

* cited by examiner

*Primary Examiner*—Jared J. Fureman
*Assistant Examiner*—Kristy A. Haupt
(74) *Attorney, Agent, or Firm*—Global IP Counselors, LLP (57) ABSTRACT

Two-dimensional Code having superior decoding property making it possible to control the level of error correcting codes, and a method for encoding and decoding the two-dimensional code is provided. The two-dimensional code includes a finding pattern area comprised of finding patterns for discriminating the code area from the whole image, a timing pattern area comprised of timing patterns for checking a position of the data area from the whole code and the position of each cell of the data area, and a data area being inputted with various kinds of data and decoding information.

10 Claims, 11 Drawing Sheets

A: Finding Pattern
B: Timing Pattern
C: Data Pattern

| 0 | 3 | 6 | 1 | 4 | 7 | 2 | 5 |
|---|---|---|---|---|---|---|---|
| 1 | 4 | 7 | 2 | 5 | 0 | 3 | 6 |
| 2 | 5 | 0 | 3 | 6 | 1 | 4 | 7 |

TWO-DIMENSIONAL CODE HAVING SUPERIOR DECODING PROPERTIES MAKING IT POSSIBLE TO CONTROL THE LEVEL OF ERROR CORRECTING CODES, AND A METHOD FOR ENCODING AND DECODING THE SAME

TECHNICAL FIELD

The present invention relates to a two-dimensional code having superior decoding properties, and more particularly, an ability to reduce overhead in decoding processing and to have the superior decoding properties in an the environment of recognition failure or symmetric errors in codes.

Furthermore, the two-dimensional code in the present invention makes it possible to decode an index code and data directly, and to control the level of Error Correcting Codes (ECC) according to a user configuration of codes. Further, it is possible to decode code data by using error Reed-Solomon correction codes in spite of corruption of the code data.

RELATED ART

The barcodes are classified into one-dimensional and two-dimensional barcodes according to prior art. One-dimensional barcodes are arranged with a combination of white and black bars which are constituted in different widths. Two-dimensional barcodes are constituted of information data units contained in the codes by matrix formation, which is arranged two-dimensionally, for example data matrix and QR codes. Further, PDF 417 code is constituted by piling up one-dimensional barcodes in the column direction.

Figure 1:
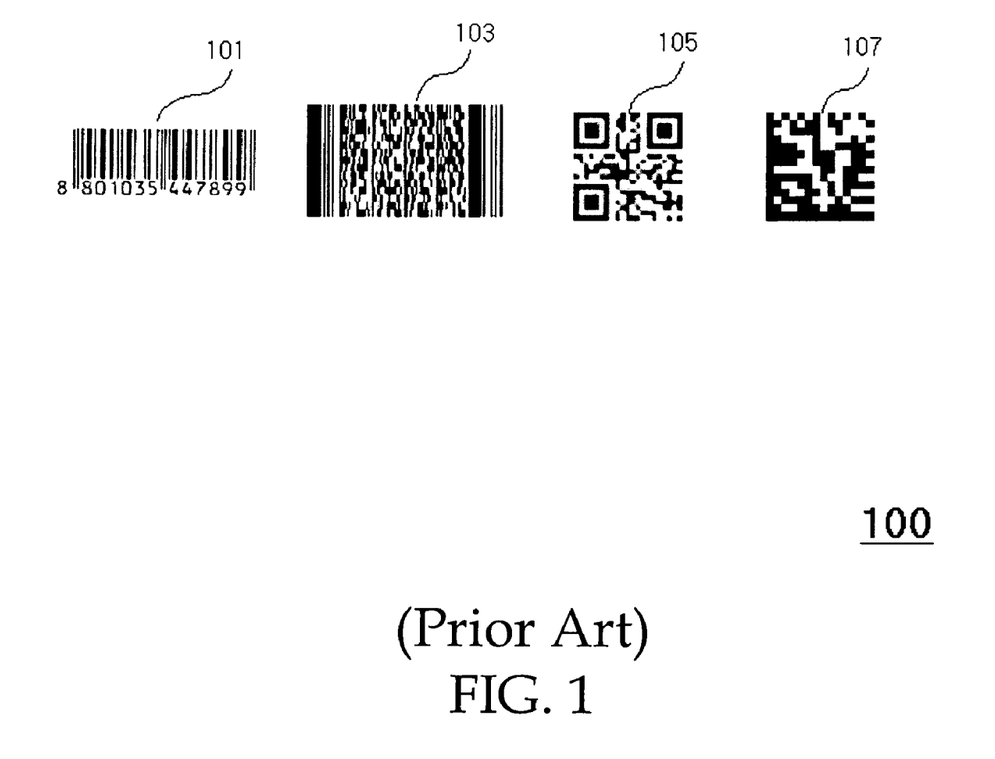
FIG. 1 shows prior art barcode images.

FIG. 1 shows one-dimensional and two-dimensional barcodes according to the prior art.

The one-dimensional barcode, which is mainly used in the conventional art, has a restriction of a recording amount of code data. The first barcode illustrated in FIG. 1 shows a one-dimensional barcode 101. The one-dimensional barcode can represent alphabets, figures, or special characters as data. The other one-dimensional barcodes, which are not shown in FIG. 1, are UPC (Universal Product Code), EAN (European Article Numbering), code 39, Interleaved 2 of 5, code 93, code 128, Plessey code, code 11, or Standard 2 of 5 codes.

The two-dimensional barcode is a plane formation which is constituted to arrange data by row (X-direction) and column (Y-direction), and superior to the one-dimensional barcode for enlarged recording amount of data. The general two dimensional barcode can record Korean alphabet, Chinese characters, and a picture, and is superior to the one-dimensional barcode with regards to reading, and printing, etc.

The conventional two-dimensional barcodes are PDF-417 103, QR code 105, and Data Matrix 107, for example.

PDF-417 103 is a multi-layer two-dimensional code having variable symbol length and height developed by Symbol Technologies Co. of the US in 1989, and is described in U.S. Pat. No. 5,304,786. The PDF-417 103 is able to contain a lot of data compared to the conventional barcodes and to have a correction and error checking function so that it is appropriate for data files and it is able to read as the conventional linear laser scanner, linear CCD scanner, and 2D CCD scanner. One of the symbol characters is constituted of four bars and four spaces, and a length of four bars and four spaces is 17× module, which is a reason why PDF-417 is so named. PDF-417 103 can read as a variable scanner and it is an open system so that any user can apply it easily and conveniently.

QR code 105 is a two-dimensional code developed by Nippondenso Co. of Japan in 1994 and is described in U.S. Pat. No. 5,726,435. The QR code 105 was invented for fitting in a part of an automatic factory processing Quick Response Code. At an upper left side of the QR code's symbol 105 and at the right and bottom of the upper left side, there are two small cutout symbols that can be recognized, and the direction of the symbols can be read rapidly. A Reed-Solomon Algorism is selected for error checking and correction and it is possible to make a choice using 3 kinds of levels. The first level can check errors and correct 7%, the second level can check errors and correct 15%, and the third level can check errors and correct 30%.

A data matrix 107 is a matrix code developed in 1989. It was developed for increasing of the amount of expressive data per symbol. A symbol size can be 0.001~14 inches for one side. It could be a regular square by 1 inch for expressing 2334 alphanumeric characters or 500 numbers is expressed by a dot matrix printer and by 1.4 inch for all 500 ASCII. The data matrix has two kinds of symbols of ECC000-140 and ECC200 according to error checking and correction algorisms. ECC000-140 is a selected convolution error checking and correction algorism and ECC200 is a selected Reed-Solomon algorism.

Reed-Solomon code is a code of a large group type suggested by Reed and Solomon and a kind of BCH. A magnetic tape or damage on the disk surface or dust causes errors but if the RS (Reed-Solomon) code is applied, the errors can be corrected. The Reed-Solomon code can be expressed by perfectly correcting the error of 8 bites if adding 16 bites when input is 188 bites. Further, the Reed-Solomon code can strongly remove channel errors universal or satellite communications or satellite broadcasting, in which sporadic errors and a large group errors occur when connecting to Convolution Code having superior correction ability against the sporadic errors, like a superior error correction characteristics for a large group. It is applied as a medium of error correction for devices such as a CD and digital recorder (DAT), a computer memorial device, a larger-expending communication system, and selected as a standard transferal for DVB (Device Video Broadcast).

However, in the conventional art, it is impossible to decode in cases in which the data at a barcode are seriously damaged. Further, the overhead problem that occurs when decoding cannot be solved. Thus, the conventional art has a problem in that it is impossible to decode in case in which the quality of images and geometric transformation falls off. Also, the conventional art lacks a function for manufacturing an error correction value for a system or environment that uses different kinds of barcodes because the ECC level is fixed and it corresponds to the same error correction level.

DETAILED DESCRIPTION OF THE INVENTION

The present invention relates to a two-dimensional code, more specifically it is object to provide a two-dimensional code having superior decoding properties. Also it is an object to reduce overhead in decoding processing and to provided superior decoding properties in an environment of recognition failure or symmetric errors in codes.

It is another object to provide a two-dimensional code that is able to decode for seriously damaged data by using Reed-Solomon ECC (Error Correction Code), to adjust each of the ECC levels according to environmental use of a code of by a user, and to decode directly data and an index code.

To achieve the above object, a two-dimensional code having a finding pattern area including finding patterns for discriminating a code area from whole image, a timing pattern area including timing patterns for checking a position of data region and each cells in the data region from whole code image, and a data area recording various kinds of predetermined data and decoding information of data itself is provided.

To achieve the above object, a method for encoding two-dimensional code having a step for inputting encoded information; a step for deciding a number for each codeword according to the information; and a step for generating each codeword and a step for encoding data of the generated codeword.

To achieve the above object, a method for decoding of the two-dimensional code having a step of scanning for physically or electrically code images; a step of retrieving for finding pattern through said scanning; a step of analogically interpreting slope of total code image through said retrieved finding pattern; a step of retrieving for timing pattern; a step of computing a position of the code through the retrieved timing pattern; a step of fine tuning for the computed position and slope of code; a step of extracting grid coordinates in the data area to use the coordinates formed by the each of the retrieved timing patterns; a step of extracting for bit patterns in each grid extracted from the grid coordinate in the data area; a step of extracting for code value from the extracted bit patterns; a step of extracting for a codeword from the extracted code value; and a step of decoding for said extracted codeword.

EMBODIMENTS

Hereinafter an embodiment of the present invention will be described.

Figure 2:
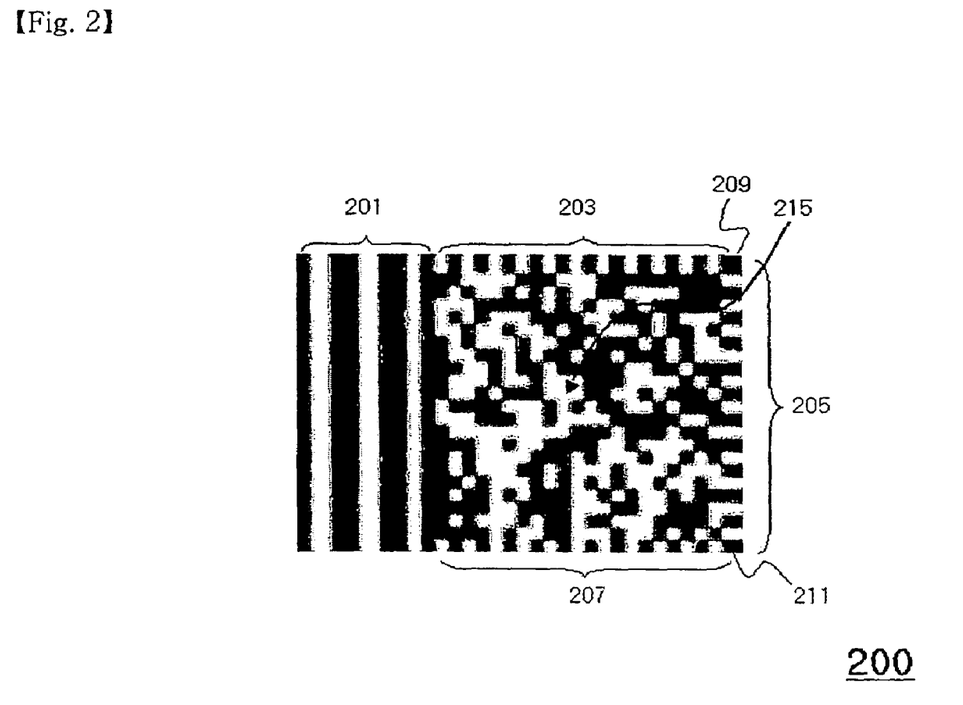
FIG. 2 shows an embodiment of two-dimensional code according to the present invention.

FIG. 2 shows an embodiment of two-dimensional code according to the present invention.

The two-dimensional code 200 shown in FIG. 2 comprises a finding pattern 201, timing patterns 203, 205, 207, 209, and 211, and coded data 215. Other embodiments of the two-dimensional code can comprise data 215 and a finding pattern 201, except the timing pattern. Further, another embodiment of the two-dimensional code can comprise data 215 and timing patterns 203, 205, 207, 209, and 211, except the finding pattern 201. However, the best embodiment of the code 200 according to the present invention comprises data 215, a finding pattern 201, and timing patterns 203, 205, 207, 209, and 211, shown in FIG. 2.

Hereinafter constitution and construction of the two-dimensional code will be described with reference to FIG. 3.

Figure 3:
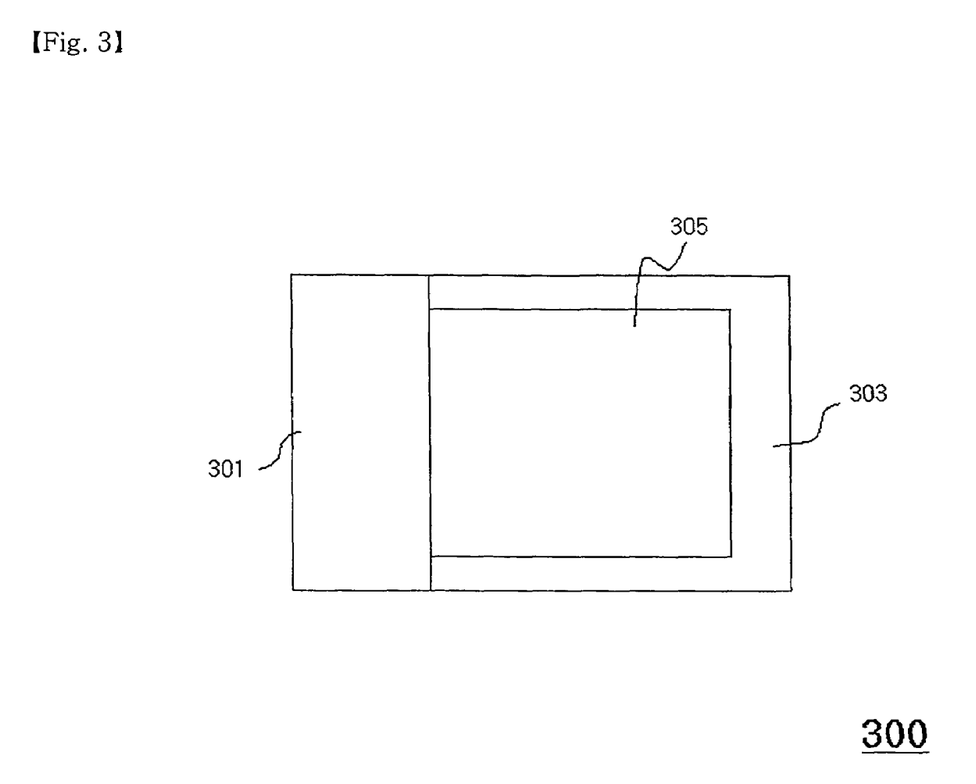
FIG. 3 shows an embodiment of a geometrical construction of the two-dimensional code according to the present invention.

FIG. 3 shows an embodiment of a geometrical construction of the two-dimensional code according to the present invention.

The preferred embodiment of the two-dimensional code comprises three areas, shown in FIG. 3. The three areas are a finding pattern area 301, timing pattern area 303, and data area 305.

1. Elements of Code (1) Finding Pattern Area 301

A code image may exist independently and by itself, but it is customary to recognize the code image with other noise images. So it is necessary to discriminate the code image, which is recognized by an image recognition system like a scanner or camera, to another noise image from the whole recognized image. The finding pattern 201 is a standard element by which the code image is discriminated.

The left side in the total area of the code is placed on the finding pattern 201, which is the finding pattern area 301, shown in FIG. 2 and FIG. 3.

The finding pattern 201 comprised in the finding pattern area 301 reduces overhead in decoding processing by discriminating the code area from whole acquired image more easily. So, it is possible to decode the code in a low performance CPU system.

The finding pattern area placed in left-side shown in FIG. 3 is just an example of the present invention, and it is possible to change the location of the finding pattern area and be within the scope of the present invention. Other embodiments of the finding pattern area are described later with reference to FIG. 4.

(2) TIMING PATTERN Area 303

Referring to FIGS. 2 and 3, the timing pattern area 303, which includes timing patterns 203, 205, 207, 209, and 211 for checking of data region position and each cell in the data area, is located at the top side, bottom side, and right side of the whole code image on the data area 305.

The timing patterns 203, 205, 207, 209, and 211 included in the timing pattern area 303 check the data area 305 in the code 200, and more easily check the position of each cell into the data area 305.

If degradation like a blurring or geometric distortion of an image occurs in the code image, it is impossible to decode the code data or to check the position of cells. Thus, the timing patterns 203, 205, 207, 209, and 211 are set up in a predetermined area in the code, and degradation of the code image does not prevent decoding of the code or checking the position of cells because of the checking of the position of each cell by the timing patterns 203, 205, 207, 209, and 211. Moreover, decoding errors for a mirror image of the code is prevented and easy detection of printing errors to the naked eye is possible, as each cell of the top, bottom and right sides of the timing pattern area 303 is comprised to different from one another.

(3) DATA Area 305

The area surrounded the finding pattern area 301 and the timing pattern area 303, that is a center area of the code image 200, is a data area 305. The data area 303 comprises data patterns 215, which include various kinds of predetermined data and decoding information of the data itself.

Each cell in the data area 305 is composed of two colors in gray scale of which one is black having a value of 1 bit and the other is a white having a value of 0 bit. The encoded source information is figures, marks, alphabets, Korean alphabets, special characters, etc. The encoding processing comprises a Reed-Solomon (RS) error-correction algorithm. Further, the data area includes information related to the RS error-correction level by means of BCH encoding. That is, the information included to the data area is coded data and the information of error correction level. Details related to the data are described later with reference to FIG. 11.

The symbol image included in the various patterns exists in physical or electrical space, and a border of empty space surrounding the symbol can be further comprised of the code image.

The quiet zone is not shown in the Figures and generally allotted to "2X" module or more. The quiet zone is provided to confirm the existence of the symbol by maintaining a signal level for a uniform time in case of reading the symbol.

The elements shown in FIG. 3 are just examples of the present invention, and the position of three areas is not limited to those of FIG. 3.

The position of the finding pattern 301 can be located on the right side, top side or bottom side according to other embodiments of the present invention. It is possible to locate right and left, or top and bottom by being divided. Other embodiments mentioned above are show in FIG. 4 and FIG. 5.

Figure 4:
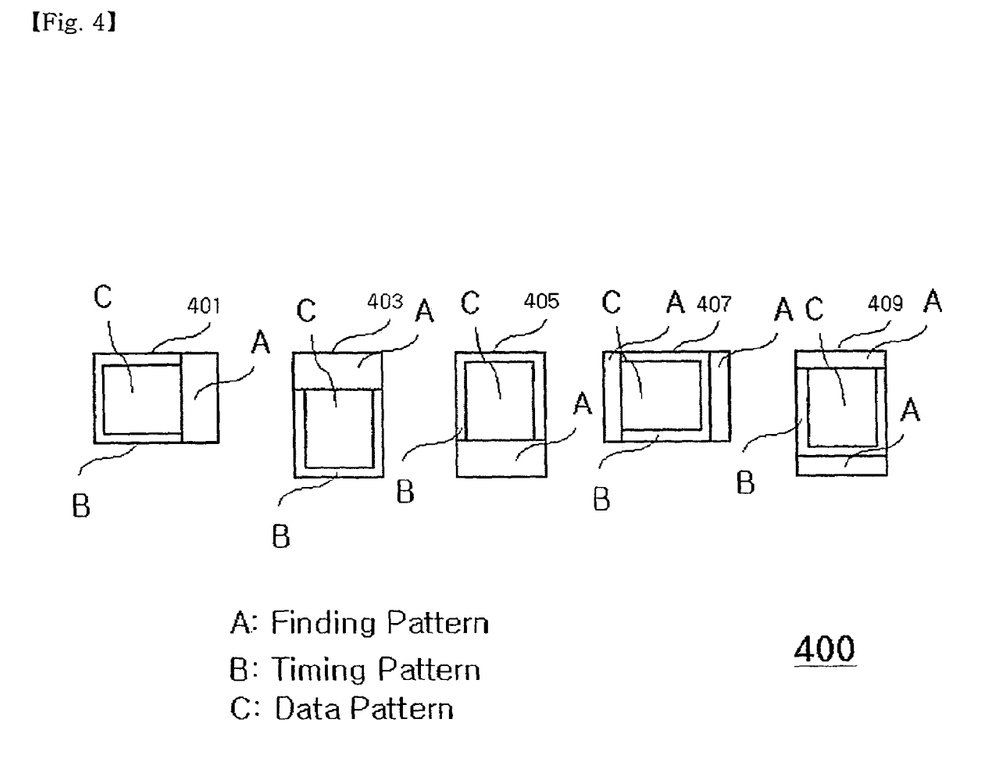
FIG. 4 shows deformation embodiments of two-dimensional code related to a finding pattern.
Figure 5:
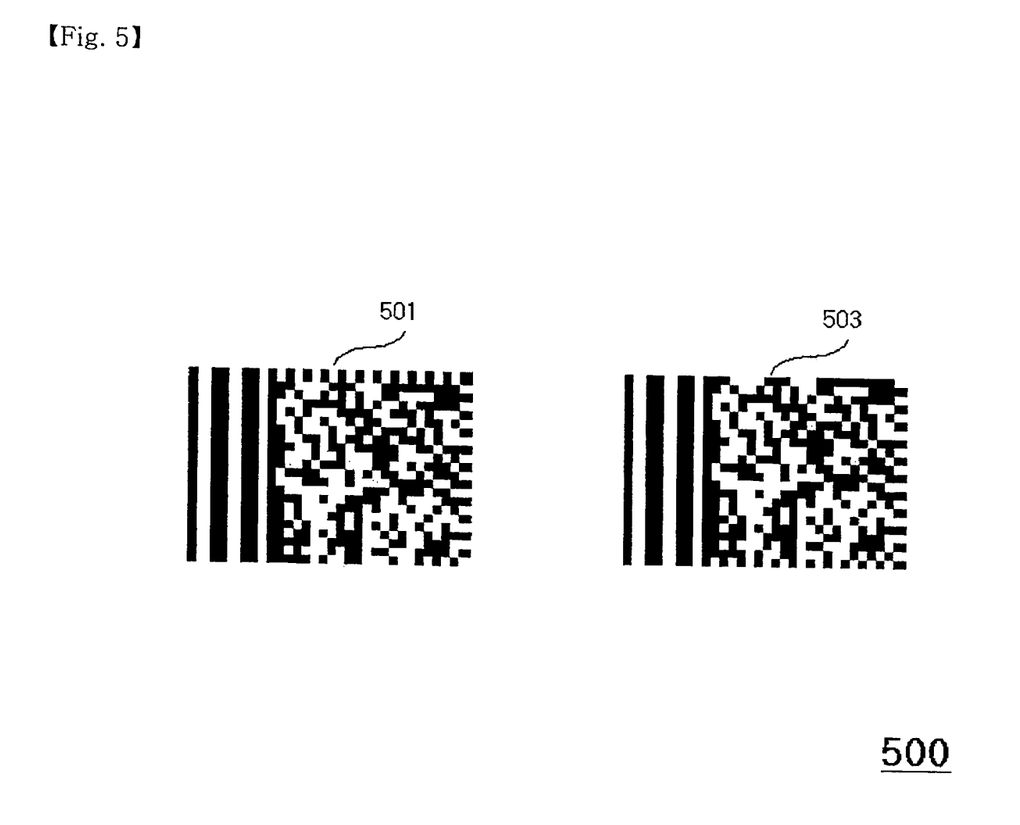
FIG. 5 shows deformation embodiments of two-dimensional code related to a timing pattern.

FIG. 4 and FIG. 5 show deformation embodiments of two-dimensional code related to the finding pattern and timing pattern.

The finding pattern area A can be placed on the right side of a code 401, top side of a code 403, bottom side of a code 405, divided left and right of a code 407, and divided top and bottom of a code 409, as shown in FIG. 4. Even if the finding pattern area is comprised to a various embodiments like in FIG. 4, the finding patterns must comprise at least two thick bars for a function of the finding pattern itself in the code image.

The thick bar has a predetermined width, which is recorded in a central position of the thick bar. So, the width of the thickness of the bar is properly at least 1.5 times or more the unit size of cell. The unit size of cell is "2X" module. Further, the width of the thick bar of the finding pattern is properly at least "3X" module.

The finding pattern can perform its function in any case when the thick bar of the finding pattern is comprised of at least two images that are related to a function of analogically interpreting for slope of total code image in a finding pattern, which will be described with more details later with reference to FIG. 10.

The timing pattern is not limited to FIG. 2 and FIG. 3. Other embodiments for timing patterns are shown in FIG. 5, like the above finding patterns.

FIG. 5 shows an embodiment of only one timing pattern that is individually comprised on X-coordinate and Y-coordinate. That is, one case of two-dimensional code 501 that includes timing patterns on an X-coordinate of the top site and Y-coordinate of the right site, and another case of two-dimensional code 502 which includes timing patterns on an X-coordinate of the bottom site and Y-coordinate of the left site. Preferably, it is possible to comprise two timing patterns that are placed on any one coordinate and one timing pattern placed on the other coordinate. So, the timing patterns can be comprised on three of four sides, and the remaining side among them comprises the finding pattern, as shown in FIG. 2.

However, any one pattern or area can be omitted between a finding pattern and timing pattern or areas. That is two embodiments. One is that a two-dimensional code comprises a finding pattern area including finding patterns for discriminating a code area from the whole image and located on any one-side or facing each other on two-sides of edge surfaces and a data area recorded various kind of predetermined data and decoding information of data itself. Where the finding patterns comprise a predetermined number of bars which are different from width with one another and sizes of at least two bars are 1.5 times or more as a unit size of cell. The other is that a two-dimensional code comprises a timing pattern area including timing patterns for checking a data region position and each cell in the data region from the whole code image and a data area recorded various kinds of predetermined data and decoding information of data itself. Where the timing pattern area includes at least one more row and column of edge surfaces in whole code plane, size and pattern of cells in each area are different from one another The best mode of the present invention is that the two-dimensional code comprises a finding pattern area, timing pattern area, and data area, as shown in FIG. 3.

2. Geometrical Structure of Code

Hereinafter a geometrical structure of the two-dimensional code by which it is possible to control the level of error correcting codes according to the present invention, with reference to FIG. 2, is described.

Cells of each area of the code have a unit length and width that are defined as '2X'. Thus 2X means a unit length and width, hereinafter.

(1) Structure of FINDING PATTERN 201

The finding patterns 201 have a row structure of length and color of the code, 2X black, 3X white, 4X black, 3X white, 4X black, 2X white, and 2X white from left to right (row direction) direction in sequence. Further, the column structure of the finding of patterns 201 is a long bar.

The geometrical structure and pattern of the finding patterns 201 can provide an image discrimination function whether the scanning code image is scanned in a normal direction or in turn-over code image with 180° rotated, in a raster scanning decoding process. The turn-over code image that has been rotated is called a "upside down image," hereinafter. The discriminating of the upside down image is that, reading the finding patterns 201 scanned through a raster scan, the reading value of the code structure is 2X, 2X, 4X, 3X, 4X, 3X, and 2X. Thus, it is known to the reading value of finding patterns that the scanned code image is an upside down image. Thus, the upside down image can be nomally decoded if the scanned image has a finding pattern 201.

(2) Structure of TIMING PATTERN 203, 205, 207, 209, 211

The timing pattern area comprises at least one more row and column of edge surfaces in a whole code plane. According to FIG. 2, sizes of cells comprised of a top area 203, right area 205, and bottom area 207 are different from one another.

The cells of the top area in the timing patterns 203 have a "2X (width)×3X (height)" structure, the cells of the right area in the timing patterns 205 are "3X×2X", and the cells of the bottom area in timing patterns 207 are "2X×2X". Each of the cells 209 and 211 has a cross section area among the three areas 203, 205, and 207 that is different from each other. The cell 209 is "3X (width)×3X (height)" and the cell 211 is "3X (width)×2X (height)". Finally, each cell of the top area 203, right area 205, bottom area 207, and the cross section area 209 and 211 comprise a different size with one another.

Whether a scanned code image is a mirror image or not, it is possible to decode normally the scanned mirror image by comprising the timing patterns of the code. Further, it is easy to check the printed mirror image by the naked eye so that the error due to the mirror image can be corrected.

The geometric structure of the finding pattern and timing pattern is not limited to the embodiments and FIG. 2. Other embodiments of the finding pattern and timing pattern are shown in FIG. 4 and FIG. 5.

(3) Pattern of Data Area

Cells in the data area comprise the same number of cells in row and column coordinates, according to the embodiment shown in FIG. 2. Further, the number of cells is an odd number. The reason is that the timing patterns surrounding the data area fit with each other. However different numbers of cells in the data area can be constituted.

The smallest number of cells are 49, that is a value of 7 times 7, and the rational number of cells are 1681, that is a value of 41 times 41, in the data area according to the embodiment of the present invention.

Figure 6:
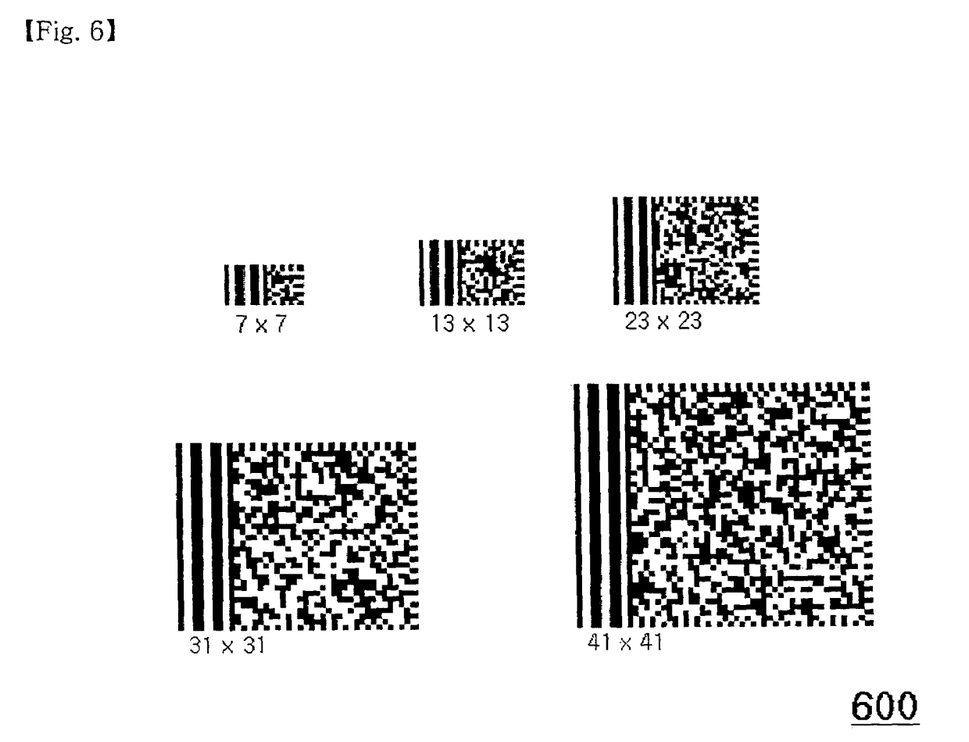
FIG. 6 shows a two-dimensional barcode according to a number of cells in a data area.

FIG. 6 shows a two-dimensional barcode according to a number of cells in the data area.

As the number of cells increases in the data area, the amount of information recorded to barcode also increases. However, the decoding and reading of the barcode are more difficult due to the increasing amount of information in the barcode. Further, it is necessary for the barcode reading and decoding system to construct a high level configuration when the fixed barcode image has more recorded data. When the cell is increased to a fixed resolution, the barcode image is physically large. Accordingly, the number of cells in the data area can be properly selected to consider the condition of the physical size in barcode image and the resolution of barcode reading system.

Hereinafter encoding of data is described.

An encoded data can be a figure, mark, Korean alphabet, Chinese alphabet, English alphabet, special characters, byte information, etc.

3. Encoding of DATA

Figure 7:
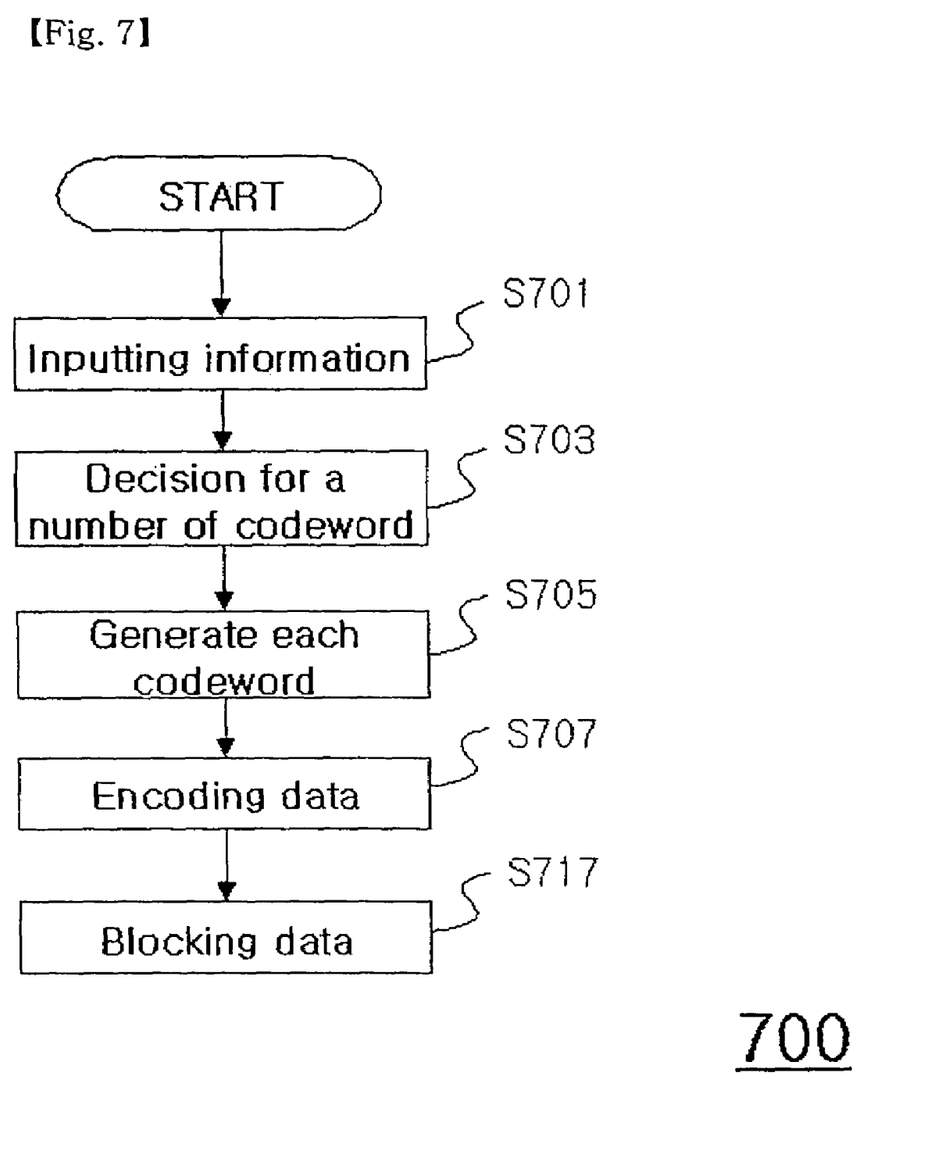
FIG. 7 shows a flow chart for an encoding process from data to two-dimensional code.

FIG. 7 shows an encoding process of data for two-dimensional code.

First, encoding information S701 is input.

The encoding information can be data to be encoded, size of cell, and a level of error correcting codes.

In the second step S703 a number of each codeword according to the information is described. The number of the codewords is a total number of codewords, data codewords and Reed-Solomon (RS) codewords.

In the third step S705, each codeword that uses the above data and pad character is generated.

The pad character does not effect to output character, which is a dummy value supplemented to an empty space except data.

In the fourth step S707, data are encoded.

Data encoding is started using an ASCII encoding mode, and encoded so that two continuous figures are double density and the Korean alphabet is in the Korean encoding mode. The Korean alphabet supports a 2350 number of complete type HANGUL according to the Rule of KSC 5601-1987, and encodes 12 bits per each character.

According to an appropriate embodiment of the present invention, a BCH code is supplemented to the data area of the code in case that the total number of cells in the data area is more than 81. Further, the BCH code is overlapped in a high level of error correction code. The ECC level is fixed in at a size of 7×7.

In the fifth step S717, the encoded data of the step S707 of encoding processing are blocked.

More details regarding data blocking are described later with reference to FIG. 8.

4. Blocking of DATA

Figure 8:
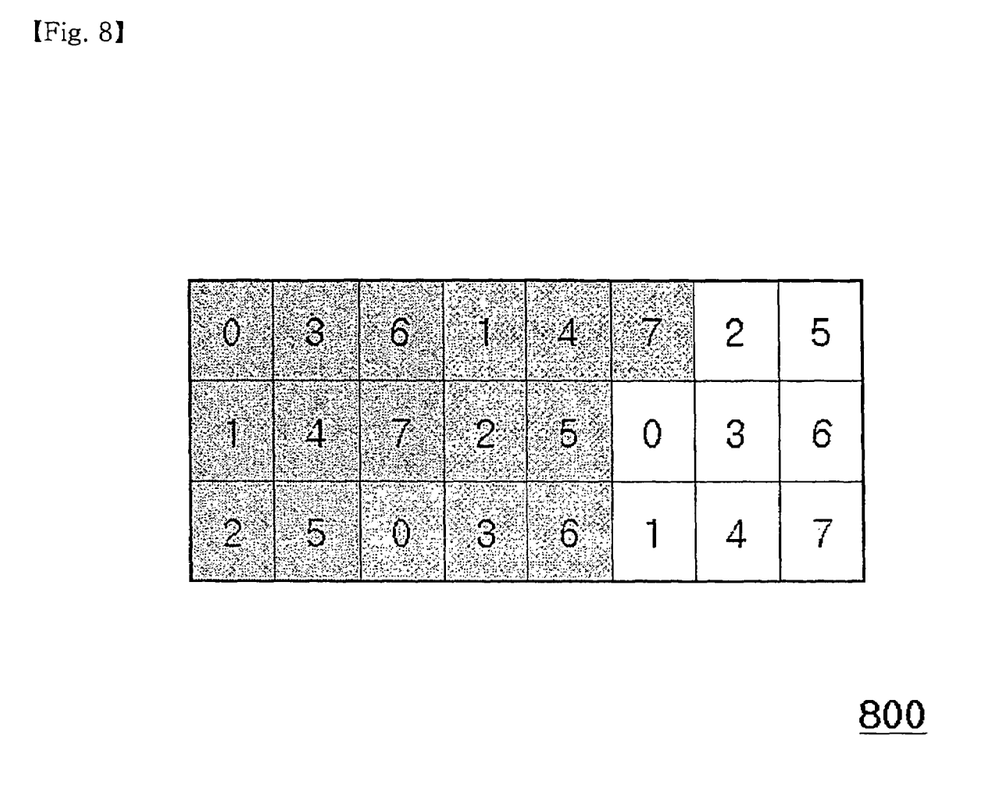
FIG. 8 shows a blocking diagram of encoded data.

FIG. 8 shows a blocking diagram of encoded data through the processing of FIG. 7.

Data are arranged from left to right based on 24 bits (3 bytes) showed in FIG. 8. The BCH code is further arranged to a head of the code in case that total number of cells in data area is more than 81. To make 16 bits (2 bytes) remain one bit, which is an LSB (least significant bit), is processed to 0 value of bit because the BCH code is 15 bits.

After arranging the BCH code, a pad and ECC codeword continuously arranged from left to right. Remaining data are arranged on a next line according to a size of the matrix. The codeword is arranged to that order and method, and the last one bit to remain is processed to 1 bit.

5. Decoding of DATA

Figure 9:
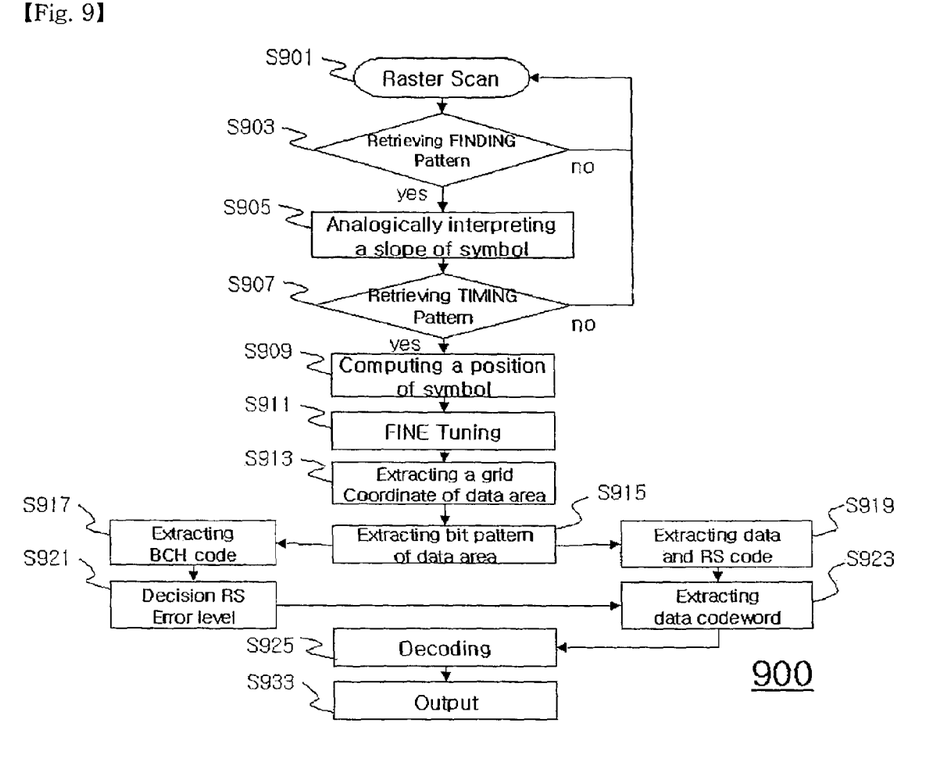
FIG. 9 shows a flow chart of decoding processing.

FIG. 9 shows a flow chart of decoding processing.

In the first step S901, a barcode image using a scanner or camera is scanned.

The image scanning of S901 is done by a raster scan method of according to an appropriate embodiment in the present invention. The raster scan is a horizontal raster made so that a dot or pixel is scanned as if drawing a horizontal line to the code image with line by line drawing from the upper area to the bottom. Another method of vector scanning is scanning the code image as if drawing a free line on the code image. Thus, any scanning method according to a system configuration is used.

In the second step S903 is the finding pattern is retrieved through the scanning processing.

The retrieving is that a plurality of horizontal scan lines is extracted to the retrieved finding pattern.

If the finding pattern is not retrieved by the horizontal scanning processing, a vertical scan line is extracted to retrieve the finding pattern. Details of the extracting of the scan line are described with reference to FIG. 10.

Figure 10:
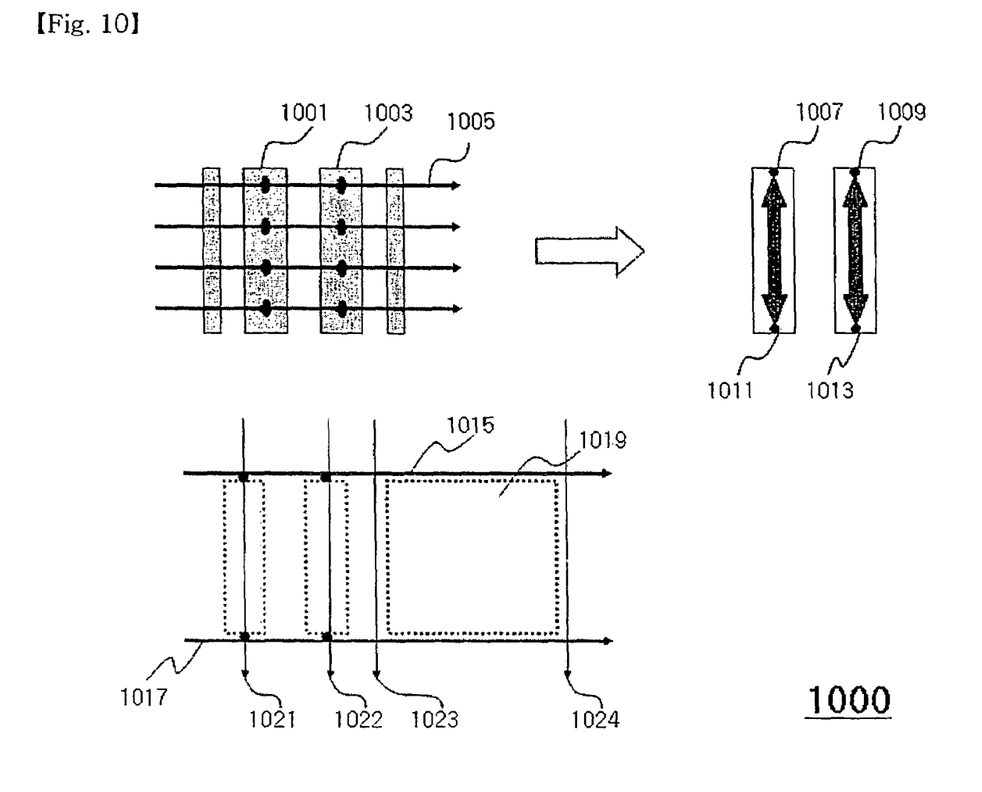
FIG. 10 shows a method of analogically interpreting for a slope of total code image through a retrieved finding pattern.

FIG. 10 shows a method of analogically interpreting a slope of total code image through the retrieved finding pattern. The finding pattern must exist in two brick bars 1001 and 1003 as mentioned before. The reason is that central positions of the two brick bars 1001 and 1003 are recorded by means of retrieving the finding pattern in the scanning line 1005, and both end points of 1007, 1009, 1011, and 1013 in the two brick bars are retrieved based on the central position.

A slope of the finding pattern 1015 and 1017 is analogically interpreted from the end points of 1007, 1009, 1011 and 1013. And finally a slope of whole symbol is analogically interpreted from the slope of the finding pattern 1015 and 1017 in step S905.

If it fails to retrieve the finding patterns, code image is scanned again.

After step S905, the timing pattern is retrieved in step S907.

If the timing pattern is retrieved in S907, the whole symbol position is computed through above retrieving result in S909.

Through S907 of the retrieved timing pattern, the position and slope of whole symbol is acquired. Further, the upside down image and mirror image can be decoded in normally by the retrieved finding pattern and timing pattern.

Step S911 is a fine tuning of the position and slope of the symbol using the finding pattern and timing pattern. In step S911, a number of cells in the data area are obtained.

Step S913 extracts a grid coordinate of data area by the coordinate based on the position of timing pattern obtained to the step S911.

Step S915 extracts a bit pattern in the data area in which black is 1 bit and white is 0 bit.

Step S917 extracts a BCH code from the extracted bit pattern.

Step S919 extracts data and RS code from the extracted bit pattern.

Step S921 decides an error level of RS code from the extracted BCH code of S917.

Step S923 extracts the data codeword from the data and RS code extracted in S919.

Step S925 decodes the data codeword.

Finally, through step S933, output is printed by the decoding of S925.

6. Level of ECC and Control Method

Figure 11:
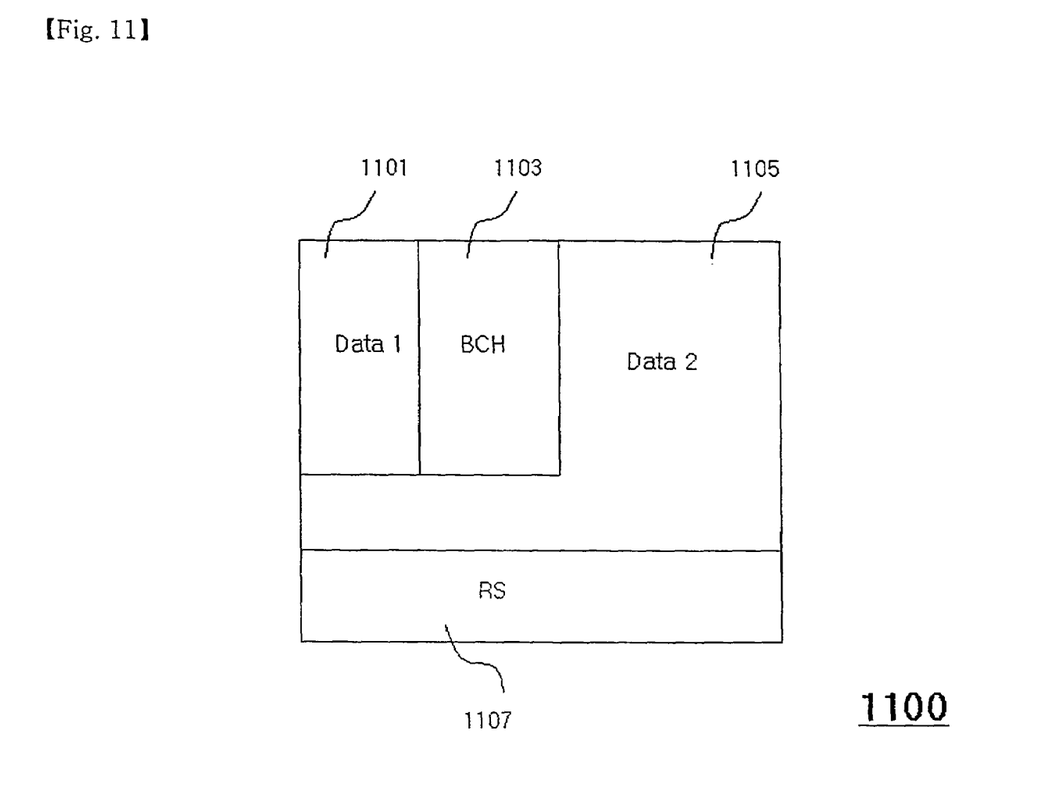
FIG. 11 shows a schematic diagram of a data area.

FIG. 11 shows a schematic diagram of the data area.

The data area comprises first data code 1101, BCH code 1103, second data code 1105, and RS code 1107, shown in FIG. 11. The BCH code and RS code, shown in FIG. 11, are just an embodiment of the present invention, and another equivalent code can be substitute for the BCH and RS code.

The first data code 1101 and BCH code are recorded on error level information of RS code 1105, according to FIG. 11.

The objected output data can be decoded from the RS code 1107 by means of deciding an error level through decoding the first data code 1101 and BCH code 1103.

An error probability of the data area in decoding processing is different from the quality of the input image. The controlling of the quality level in the input image is an error level controlling. As the error level is set up high, the efficiency of error correcting is superior to the level. Thus, the efficiency of decoding is also superior in proportion to the error level. However, an amount of data to be encoded decreases, as the error level is set up high. That is the error level is in inverse proportion to the amount of data to be recorded.

Thus, the error level can be set up to consider the objected amount of data and the configuration to acquire an input image and decoding system is also considered. The error level is controlled according to the configuration of providing the barcode image and using the code image in the present invention.

INDUSTRIAL APPLICABILITY

According to the present invention, a two-dimensional code having superior decoding properties in which it is possible to control the level of error correcting codes, and a method for encoding and decoding the two-dimensional code are provided. The code of the present invention can be decoded in cases of symmetric error or failure to reading the code image due to a blurring or distortion of image.

Further, the ECC (Error correction code) control is possible according to the configuration.

What is claimed is:

1. A two-dimensional code comprising:
   a finding pattern area including finding patterns to discriminate a code area from a whole image;
   a timing pattern area including timing patterns to check a data region position and each cell in a data region from a whole code image, said timing pattern area being configured on three sides of said whole code image; and
   a data area having recorded various kind of predetermined data and decoding information.

2. The two-dimensional code as claimed in claim 1, wherein said coded data recorded in said data area are at least one among a figure, mark, Korean alphabet, English alphabet, or special character.

3. The two-dimensional code as claimed in claim 1, wherein said data are directly interpreted by decoding process.

4. The two-dimensional code as claimed in claim 1, further comprising a quiet zone for identification of an existence of said code, wherein a size of said quiet zone is at least a standard unit size of a cell in said code.

5. The two-dimensional code as claimed in claim 1, wherein said finding pattern area is located on any one-side or facing each other on two-sides of edge surfaces, and
   said finding patterns has a predetermined number of bars which are different in width from one another.

6. The two-dimensional code as claimed in claim 5, wherein said finding patterns has two black bars wherein each width of said black bars is at least 1.5 times or more a unit size of a cell.

7. The two-dimensional code as claimed in claim 5, wherein said timing pattern area is located on at least any one or more sides of said edge surfaces except said finding pattern area.

8. The two-dimensional code as claimed in claim 7, wherein said timing pattern area has at least one more row and column of edge surfaces in a whole code plane, and the sizes of the cells in each area are different from one another.

9. The two-dimensional code as claimed in claim 1, wherein said data area includes
   a first data code,
   a Reed-Solomon code,
   a second data code that codes and records an error level information of said Reed- Solomon code, and
   a BCH code.

10. The two-dimensional code as claimed in claim 9, wherein codeword data are extracted from said first data code and said Reed-Solomon code by an error-level decision of said Reed-Solomon code from said BCH code.

* * * * *